US007437960B2

(12) United States Patent
Priebsch

(10) Patent No.: US 7,437,960 B2
(45) Date of Patent: Oct. 21, 2008

(54) DEVICE FOR DETECTING LABELS ON A CARRIER MATERIAL

(75) Inventor: Hans-Dieter Priebsch, Bissingen (DE)

(73) Assignee: Leuze Electronic GmbH & Co. KG, Owen/Teck (DE)

( * ) Notice: Subject to any disclaimer, the term of this patent is extended or adjusted under 35 U.S.C. 154(b) by 180 days.

(21) Appl. No.: 11/415,506

(22) Filed: May 1, 2006

(65) Prior Publication Data

US 2006/0260406 A1 Nov. 23, 2006

(30) Foreign Application Priority Data

Apr. 30, 2005 (DE) ....................... 10 2005 020 255

(51) Int. Cl.
*G01M 19/00* (2006.01)
*G01H 9/00* (2006.01)

(52) U.S. Cl. ........................................ 73/865.8; 73/655

(58) Field of Classification Search ................ 73/865.8, 73/866, 649, 655, 656
See application file for complete search history.

(56) References Cited

U.S. PATENT DOCUMENTS 5,486,063 A * 1/1996 Fox et al. .................... 400/708
5,796,091 A * 8/1998 Schmidt et al. ......... 235/472.01
6,314,054 B1 * 11/2001 Priebsch ....................... 367/93
6,709,393 B2 * 3/2004 Ogawa ........................ 600/443
7,172,195 B2 * 2/2007 Sano et al. .................. 271/262

FOREIGN PATENT DOCUMENTS

DE 199 21 217 A1 11/2000
JP 2000-202369 * 7/2000

* cited by examiner

*Primary Examiner*—Helen C. Kwok
(74) *Attorney, Agent, or Firm*—Venable LLP; Robert Kinberg

(57) ABSTRACT

A device for detecting labels on a carrier material conveyed through a detection plane includes an optical sensor and an ultrasonic sensor. Each sensor is arranged to detect labels. Switching elements selectively activate one of the sensors.

11 Claims, 2 Drawing Sheets

DEVICE FOR DETECTING LABELS ON A CARRIER MATERIAL

CROSS-REFERENCE TO RELATED APPLICATION

This application claims the priority of German Patent Application No: 10 2005 020 255.1, filed on Apr. 30, 2005, the subject matter of which is incorporated herein by reference.

BACKGROUND OF THE INVENTION

The invention relates to a device for detecting labels on a carrier material.

A device of this type is known from reference DE 199 21 217 A1, wherein this device for detecting labels on a carrier material is provided with a transmitter for emitting ultrasonic waves and a receiver for receiving ultrasonic waves. For the detection, the carrier material provided with the labels is guided through the space between transmitter and receiver. The ultrasonic waves are weakened differently, depending on whether only the carrier material itself or the carrier material with a label attached thereto is detected by the ultrasonic waves in the area between transmitter and receiver. The respective differences in the receiving signal at the receiver output are detected by comparing the received signal to a threshold value, wherein this threshold value is adapted with the aid of a balancing operation to the receiving levels that occur. During the balancing operation, which is realized before the label detection, the threshold value level for the carrier material arranged between transmitter and receiver and/or a label attached thereto is determined automatically in dependence of the recorded receiving signal.

With this type of device it has proven to be a disadvantage that a secure detection of labels is not guaranteed, in particular for more bulky carrier materials such as those composed of paper.

SUMMARY OF THE INVENTION

It is an object of the present invention to provide a device of the aforementioned type, which allows the secure label detection over the broadest possible spectrum of carrier materials and label materials.

The above and other objects of the invention are achieved herein according to an exemplary embodiment of the invention wherein there is provided a device for detecting labels on a carrier material conveyed through a detection plane, comprising: an optical sensor and an ultrasonic sensor, each being arranged to detect labels; and switching elements to selectively activate one of the sensors.

The device according to the invention is used for detecting labels on a carrier material and comprises an optical sensor as well as an ultrasonic sensor. These sensors can be activated selectively for the label detection by means of switching components.

A secure detection of labels over a broad spectrum of label and carrier materials is possible because the device according to the invention allows the optional use of either an optical sensor or an ultrasonic sensor for the label detection.

Whereas labels on transparent and in particular rail-type carrier materials can be detected especially easily with the ultrasonic sensor, the optical sensor is particularly suitable for detecting labels on thicker, non-transparent carrier materials, such as carrier materials composed of paper.

For the label detection, the optical sensor is selected by activating switching components and can thus be realized easily by the user.

According to a particularly advantageous embodiment of the invention, the optical sensor as well as the ultrasonic sensor both operate based on the light-barrier principle. That is to say, the transmitter and the receiver for the optical sensor on the one hand, and the transmitter and receiver for the ultrasonic sensor on the other hand are positioned respectively on alternate sides of a detection plane through which the carrier material with the labels is guided, relative to the device. For this, the device is preferably disposed inside a fork-shaped housing with two fork arms, between which the detection plane extends.

It is particularly advantageous if the components of the optical sensor and the ultrasonic sensor are arranged inside the housing in such a way that the beam axis for the ultrasonic waves, emitted by the ultrasonic transmitter, and the optical axis for the light rays emitted by the transmitter intersect in the detection plane. The actual measuring location and the measuring instant for detecting the labels consequently do not depend on whether the ultrasonic sensor or the optical sensor is used for this.

According to one advantageous embodiment, the labels are detected by means of a threshold value evaluation of the signals received at the optical receiver or the ultrasonic receiver. The threshold value used in this case is preferably determined by means of a balancing operation, wherein the carrier material with labels is detected during the balancing operation by using either the optical or the ultrasonic sensor. A particularly high detection safety is thus achieved since the threshold value is derived from the measuring values from the label detection itself.

The device according to the invention furthermore has the advantage that essential components of the evaluation circuit for this device can be utilized for the optical sensor as well as the ultrasonic sensor, thereby resulting in a particularly simple and cost-effective design of the evaluation circuit. In particular, a modulation unit can be used to modulate the ultrasonic waves emitted by the ultrasonic transmitter as well as to modulate the light rays emitted by the optical transmitter. Furthermore, a balancing circuit can be used for realizing a balancing operation with activated ultrasonic sensor or optical sensor.

BRIEF DESCRIPTION OF THE DRAWINGS

These and other features and advantages of the invention will be further understood from the following detailed description of the exemplary embodiments with reference to the accompanying drawings in which.

DETAILED DESCRIPTION OF THE EXEMPLARY EMBODIMENTS

Figure 1:
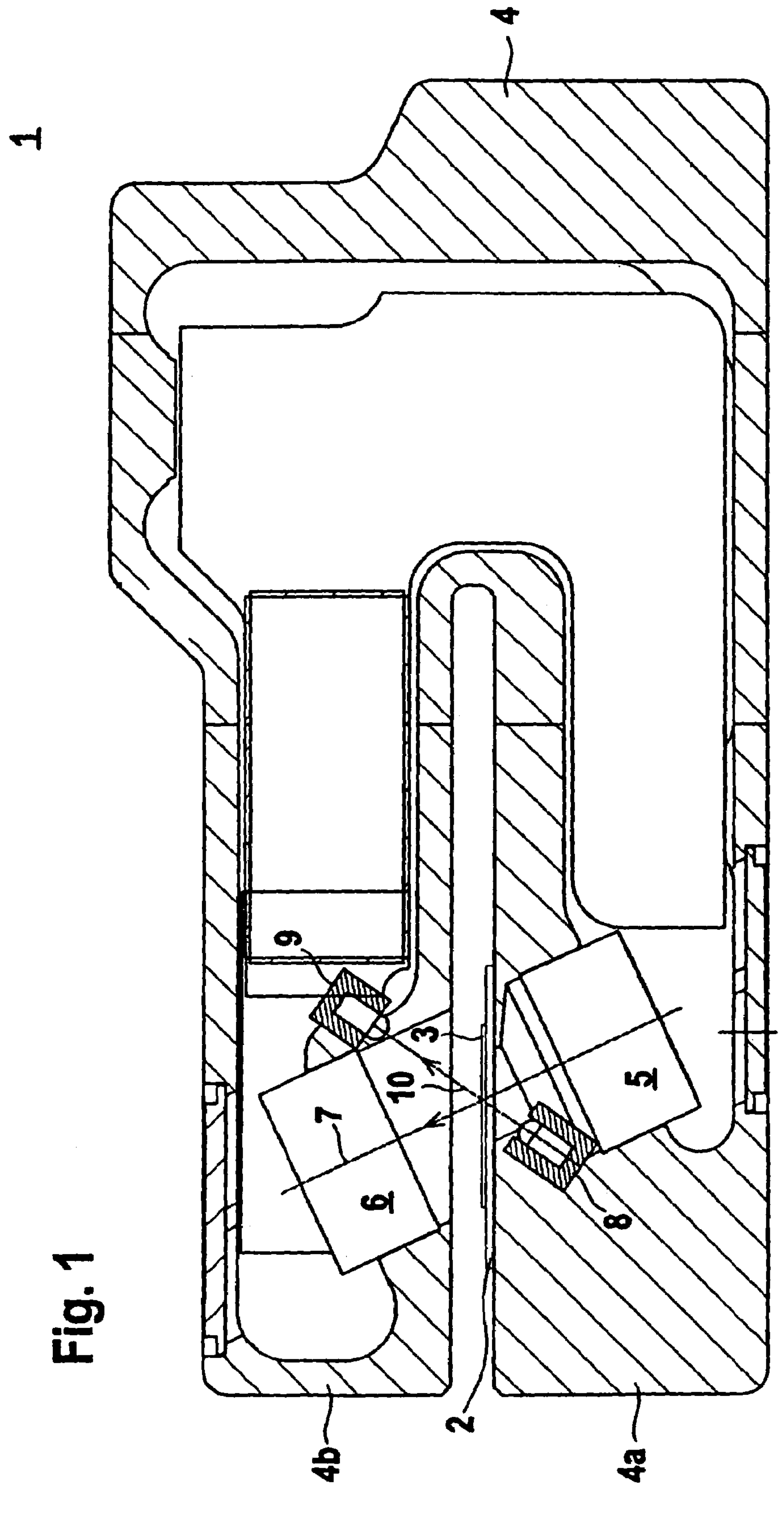
FIG. 1 shows an exemplary embodiment of a device for detecting labels on a carrier material.

FIG. 1 schematically shows the configuration of a device 1 for detecting labels 3 affixed to a carrier material 2. The device 1 is integrated into a fork-shaped housing 4 with two fork arms 4*a*, 4*b* taht extend parallel and at a distance to each other.

The band-shaped carrier material 2 with labels 3 affixed thereto is guided through the space between the fork arms 4*a*, 4*b*. For this embodiment, the fork arms are positioned to extend in a detection plane so that the housing rests on the lower fork arm 4*a*.

For the detection of the labels 3 on the carrier material 2, an ultrasonic sensor and an optical sensor are arranged inside the housing 4 for the device 1. Switching components are used to activate either the ultrasonic sensor or the optical sensor for detecting the labels 3 on the carrier material 2 in the detection plane.

The ultrasonic sensor comprises an ultrasonic transmitter 5, integrated into the lower fork arm 4*a*, as well as an ultrasonic receiver 6 that is arranged in the upper fork arm 4*b*. The ultrasonic sensor 5 emits directed ultrasonic waves along a beam axis 7, wherein these in part penetrate the carrier material 2 and the labels 3 and are then guided to the ultrasonic receiver 6. The beam axis 7 extends at an angle of inclination to the surface normal of the detection plane. As a result of the inclination of the beam axis 7 to the surface of the carrier material 2 with the labels 3 to be detected, minima and maxima of the ultrasonic waves, caused by interferences, are also in part averaged out.

The optical sensor comprises a transmitter 8, integrated into the lower fork arm 4*a*, as well as a receiver 9 that is arranged in the upper fork arm 4*b*. The transmitter 8 emits light rays along an optical axis 10, wherein the transmitting light rays in part penetrate the carrier material 2 with labels 3 and are then guided to the receiver 9. The transmitter 8 emits light rays in the infrared range. The optical axis 10 of the transmitter 8 also extends at an angle to the carrier material 2, wherein the ultrasonic sensor and the optical sensor are arranged such that the beam axis 7 and the optical axis 10 intersect in the detection plane.

In principle, the arrangement of the optical sensor inside the housing 4 can be modified such that mirrors are used for deflecting the transmitted light rays in order to couple the transmitted light rays into the detection plane.

Figure 2:
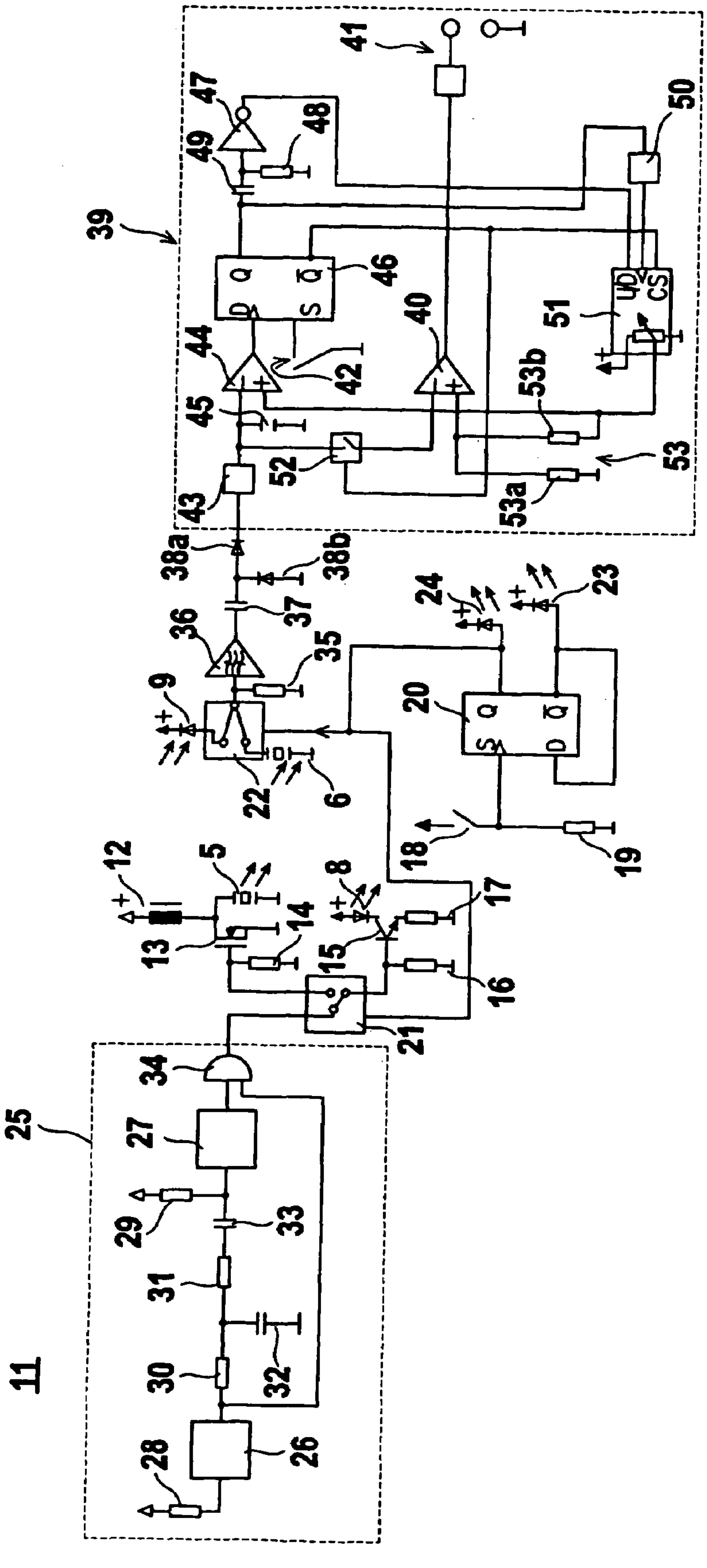
FIG. 2 shows an evaluation circuit for the device according to FIG. 1.

FIG. 2 shows the evaluation circuit 11 for the device 1 according to FIG. 1. For this evaluation circuit 11, the transmitter 5 and the receiver 6 are components of the ultrasonic sensor while the transmitter 8 and the receiver 9 represent components of the optical sensor and are provided with the same reference numbers as in FIG. 1.

The ultrasonic sensor is triggered by means of a drive circuit, comprising a coil 12, a MOSFET transistor 13, and a resistor 14. The coil 12 provides the voltage required for the operation of the ultrasonic transmitter 5, while the MOSFET transistor 13 is used for switching the ultrasonic transmitter 5. The optical sensor is triggered with the aid of a drive circuit comprising a transistor 15 and two resistors 16, 17.

The ultrasonic sensor or the optical sensor is optionally activated with the aid of switching components. To select either the ultrasonic sensor or the optical sensor, a user activates a release key 18 on the outside of the housing 4 for the device 1. The release key 18 together with a resistance 19 forms the input circuit for a D flip-flop 20. With the first switch 21 and depending on the actuation of the D flip-flop 20, only the ultrasonic transmitter 5 or the optical transmitter 8 is connected to the evaluation circuit 11. With the second switch 22 and depending on the actuation of the D flip-flop 20, only the ultrasonic receiver 6 or the optical receiver 9 is connected to the evaluation circuit 11.

Respectively one light-emitting diode 23, 24 is connected to the outputs Q, $\overline{Q}$ of the D flip-flop 20. The light-emitting diodes, which are arranged to be visible on the outside of the housing 4, function as display elements that signal whether the ultrasonic sensor or the optical sensor is activated. The first light-emitting diode 23 only lights up in case the ultrasonic sensor is activated while the second light-emitting diode 24 lights up only if the optical sensor is activated.

According to FIG. 2, a modulation unit 25 is formed with a portion of the evaluation circuit 11. Depending on the position of switch 21, either the ultrasonic waves emitted by the ultrasonic transmitter or the light rays emitted by the optical transmitter 8 are modulated with the modulation unit 25.

The modulation unit 25 comprises two pulse generators 26, 27, provided with respectively one upstream-connected resistor 28, 29.

A ramp circuit, consisting of resistors 30, 31 and capacitors 32, 33, is installed between the pulse generators 26, 27. The outputs for the pulse generators 26, 27 are conducted to an AND element 34 which is connected to the switch 21.

In the present case, the first pulse generator 26 generates pulses with a frequency of $f_1$=9 kHz. The second pulse generator 27 generates pulses with a higher frequency $f_2$, in this case $f_2$=300 kHz.

The ramp circuit functions to generate rectangular pulses with the frequency $f_1$. The second pulse generator 27 functions to superimpose the higher modulation frequency $f_2$ on the rectangular pulses. Depending on the position of switch 21, this modulation is imprinted on the ultrasonic waves or the transmitted light rays.

Depending on the position of switch 22, either the signals received at the ultrasonic receiver 6 or the signals received at the optical receiver 9 are filtered in a circuit arrangement, comprising a resistor 35, a band-pass filter 36, a capacitor 37, and two diodes 38*a*, 38*b*. The signals are then fed to the receiving side of the evaluation circuit 11 that forms an evaluation unit 39 with a therein integrated balancing circuit.

The evaluation unit 39 is provided with a comparator 40 and a circuit output 41 connected thereto. While the device 1 is operational, either the ultrasonic sensor or the optical sensor is activated for the label detection. To differentiate between the labels 3 and the carrier material 2, the signals received in the ultrasonic receiver 6 or in the optical receiver 9 are assigned a threshold value in the comparator 40, thereby generating a binary switching signal, the switching states of which indicate whether or not a label 3 was detected. The binary switching signal is read out via the switching output.

The threshold value is determined with the aid of a balancing operation, which is carried out prior to the start-up of the device 1. For this, either the ultrasonic sensor or the optical sensor is activated before the balancing operation is realized by activating the release key 18. The balancing operation is realized with the aid of a balancing circuit.

The balancing circuit comprises a teach-in key 42 which can be used to start the balancing operation. During the balancing operation, the threshold value for the comparator 40 is derived automatically from the signals received at the ultrasonic receiver 6 or the optical receiver 9, wherein these signals are recorded during the label detection.

To start the balancing operation, a user depresses the teach-in key 42 a first time. Following this, the carrier material 2 with labels 3 is guided through the detection plane, preferably automatically. The receiving signals recorded in the process are then stored in a sample and hold element 43.

The teach-in key 42 is subsequently depressed a second time, resulting in an automatic balancing of the threshold value for the comparator 40 to the peak values of the receiving signals, stored in the sample and hold element 43.

Since the ultrasonic waves as well as the transmitting light rays are weakened more when passing through the carrier material 2 with affixed labels 3, than when passing only through the carrier material 2, the peak values correspond to the receiving signals during the detection of the carrier material 2 without labels 3.

The balancing circuit comprises a comparator 44 with an upstream-connected capacitor 45 and a D flip-flop 46 which is installed downstream of the comparator 44. An output Q of the D flip-flop 46 is furthermore followed by a trigger circuit with interface trigger 47 and upstream-connected resistor 48 and capacitor 49 and parallel thereto a step generator 50. The output $\overline{Q}$ of the D flip-flop 46 is conducted to an input CS of an $E^2$ potentiometer 51 and to a switch 52. The interface trigger 47 is conducted to an input U/D of the $E^2$ potentiometer 51. The step generator is conducted to a different input of the $E^2$ potentiometer 51. The output of the $E^2$ potentiometer is conducted to an input of the comparator 44. The output of the $E^2$ potentiometer 51 is furthermore conducted via a divider 53, consisting of two resistors 53*a*, 53*b*, onto an input of the comparator 40 which is used for generating the binary switching signal.

By depressing the teach-in key 42 for the second time, the $E^2$ potentiometer 51 is reset to its starting value with the aid of the D flip-flop 46 and the interface trigger 47.

Depressing the teach-in key 42 furthermore closes the switch 52. Following this, the input U/D of the $E^2$ potentiometer 51 is actuated via the D flip-flop 46 and the interface trigger 47, so that its resistance value is increased incrementally, wherein the increments for increasing the resistance value are predetermined by the step generator 50. The incrementing in the $E^2$ potentiometer 51 continues until its output signal corresponds to the peak value of the receiving signals, stored in the sample and hold element 43. Since the comparator 44 then reverses its operation and, in the process, correspondingly actuates the D flip-flop 46, the incrementing of the $E^2$ potentiometer 51 is completed. The subsequently present output signal at the output of the $E^2$ potentiometer 51 then defines the threshold value for the comparator 40 for the operation of the device 1, which follows the balancing operation.

Owing to the fact that the output signal from the $E^2$ potentiometer 51 is not fed directly to the input of the comparator 40, but via the divider 53, the threshold value does not correspond to the peak value of the receiving signal but only to a fraction thereof, which is determined by the resistors 53*a*, 53*b* of the divider 53. In the present case, the resistors of the divider 53 are dimensioned such that the threshold value for the comparator 40 corresponds to half the peak value.

It will be understood that the above description of the present invention is susceptible to various modifications, changes and adaptations, and the same are intended to be comprehended within the meaning and range of equivalents of the appended claims.

What is claimed is:

1. A device for detecting labels on a carrier material conveyed through a detection plane, comprising:

an optical sensor and an ultrasonic sensor, each being arranged to detect the labels on the carrier material; and a switch arranged to selectively activate one of the sensors.

2. The device as defined in claim 1, wherein the ultrasonic sensor comprises: an ultrasonic transmitter arranged on one side of the detection plane for emitting directed ultrasonic waves along a beam axis; and an ultrasonic receiver arranged on the opposite side of the detection plane to receive the ultrasonic waves.

3. The device as defined in claim 2, wherein the optical sensor comprises: an optical transmitter arranged on one side of the detection plane for emitting light rays along an optical axis; and an optical receiver arranged on the opposite side of the detection plane to receive the light rays.

4. The device as defined in claim 3, wherein the optical axis for the emitted light rays and the beam axis for the ultrasonic waves intersect in the detection plane.

5. The device as defined in claim 3, further including a fork-shaped housing including two parallel-extending first and second fork arms for the sensors arranged at a distance to each other, between which the detection plane extends.

6. The device as defined in claim 5, wherein the ultrasonic transmitter and the optical transmitter are integrated into the first fork arm of the housing and the ultrasonic receiver and the optical receiver are integrated into the second fork arm of the housing.

7. The device as defined in claim 3 , further including a modulation unit for modulating the ultrasonic waves emitted by the ultrasonic transmitter and the light rays emitted by the optical transmitter.

8. The device as defined in claim 3, further including a threshold device coupled to an output of the ultrasonic receiver and an output of the optical receiver to evaluate signals received at the output of the ultrasonic receiver and the optical receiver to detect the labels using a threshold value.

9. The device as defined in claim 8, further including a balancing device to determine the threshold value during a balancing operation.

10. The device as defined in claim 9, wherein during the balancing operation the carrier material with the labels is detected either by the optical sensor or by the ultrasonic sensor, and the threshold value is derived from the receiving signals recorded at the optical receiver or the ultrasonic receiver.

11. The device as defined in claim 10, wherein the balancing device includes a balancing circuit that is selectively inputted with the receiving signals from the optical receiver or the receiving signals from the ultrasonic receiver.

* * * * *